United States Patent
Fouquet et al.

(10) Patent No.: US 7,024,619 B1
(45) Date of Patent: Apr. 4, 2006

(54) DYNAMIC MULTIMEDIA DOCUMENT

(75) Inventors: Guy Fouquet, Nozay (FR); Olivier Martineau, Soisy/Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/373,240

(22) Filed: Aug. 12, 1999

(30) Foreign Application Priority Data

Aug. 13, 1998 (FR) .......................................... 98 09916

(51) Int. Cl.
*G06F 17/30* (2006.01)

(52) U.S. Cl. ................. 715/500.1; 707/104.1; 345/619; 717/120

(58) Field of Classification Search ................ 715/513, 715/911, 526; 709/315; 707/100, 102; 717/120, 717/115
See application file for complete search history.

(56) References Cited

U.S. PATENT DOCUMENTS

| | | | | |
|---|---|---|---|---|
| 5,581,691 A | * | 12/1996 | Hsu et al. ....................... | 714/15 |
| 5,692,205 A | * | 11/1997 | Berry et al. ................ | 715/526 |
| 6,137,483 A | * | 10/2000 | Kiyono et al. ........... | 715/500.1 |
| 6,141,001 A | * | 10/2000 | Baleh ...................... | 715/500.1 |

OTHER PUBLICATIONS

Peter Rosch, Reviewing two Multimedia Presentation (quasi–) Standards, Copyright 1996, IEEE, pp. 140–149.*

Ingo Macherius, Experts' Revolution, Verlag Heinz GmbH & Co KG, 1997, pp. 1–8.*

Seok Jae Yun, Synchronization Attributes and Rules of Active Object Oriented Database for Multimedia Presentation, 1995, World Scientific Publishing Co., pp. 358–363.*

Stephen Bugaj, Synchronized Multimedia Integration Language (SMIL) 1.0 Specification, World Wide Web Consortium, pp. 1–41.*

Seok Jae Yun et al, "Synchronization attributes and rules of active object–oriented database for multimedia presentation", Database Systems for Advanced Applications '95. Proceedings Of thee Fourth International Conference on Database Systems for Advanced Applications, Proceedings of $4^{TH}$ International Symposium On Database Systems for Advanced Applications, Singapore, 10– pp. 358–363, XP002097318.

H. Chung et al, "Memori: MHEG Engine for Multimedia Information Object Retrieval and Interchange", IEICE Transactions on Information and Systems, vol. E79–D, No. 6, Jun. 1, 1996, pp. 680–686, XP000595172.

* cited by examiner

*Primary Examiner*—Stephen S. Hong
*Assistant Examiner*—Matthew Ludwig
(74) *Attorney, Agent, or Firm*—Sughrue Mion, PLLC

(57) ABSTRACT

The invention relates to a method of dynamically representing a multimedia document described in a description language. The invention also relates to the multimedia document itself. The invention is based on the use of ECA-type formalisms, and does not require the use of compiled codes (e.g. codes compiled in Java), as is the case in the state of the art.

4 Claims, 1 Drawing Sheet

DYNAMIC MULTIMEDIA DOCUMENT

Figure 1:
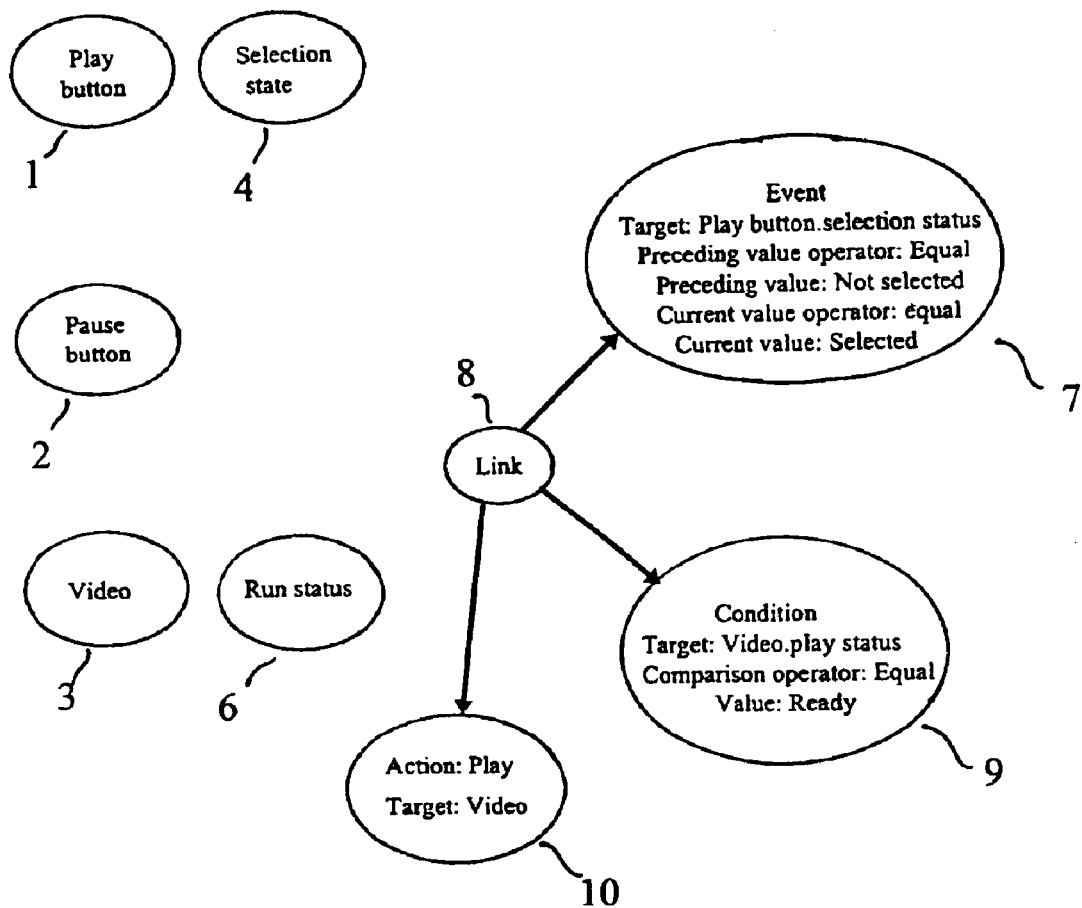

The invention relates to multimedia documents that are installed in data-processing systems.

It is known that a multimedia document can be considered as being in the form of a set of objects of an object-oriented program installed in a data-processing system, and as illustrated in particular by the publications relating to the work performed by the "Multimedia/Hypermedia Expert Group" with a view-to defining the MHEG international standard.

The objects that are contained in a multimedia document and which can be very different, in particular in terms of the dynamic aspects of the document, can thus be taken into account in a unified manner.

It can be desirable to impart dynamic aspects to a multimedia document, i.e. to make the behavior of the component elements of the document vary as a function of events (e.g. a timer event based on a clock).

Furthermore, the multimedia document can be interactive, i.e. the behavior of its component elements can be varied as a function of events generated by a user. It follows from these definitions that a multimedia document that is "interactive" is "dynamic" to an even greater extent.

Currently, in order to have properties that are dynamic (and even more so interactive), a multimedia document can be designed and produced only by a programmer, whenever the control to be provided exceeds an elementary level.

Such an elementary level corresponds, for example, to the level expressed by the concept of an anchor, i.e. the level of a GOTO-type instruction in which the destination is given in the document itself, and where the instruction is taken into account conventionally by a browser, such as Netscape or Internet Explorer, version 4.

One existing solution for making a multimedia document dynamic is described in an article entitled "Synchronization Attributes and Rules of Active Object-Oriented Database for Multimedia Presentation" by Seok Joe Yun and Woo Saeng Kim, published in "Database systems for advanced applications '95. Proceedings of the fourth international conference on database systems for advanced applications, Singapore, ISBN 981-02-2220-3. That article describes a method of producing a dynamic multimedia document, i.e. a method that manages any variation in the component elements of the multimedia document as a function of timer-type events. That method consists in implementing the multimedia document in the form of a program that is object-oriented (in the object-oriented programming sense). Each object is associated with a respective element of the document, and each attribute of an object is associated with a status of the element in question (color, run-speed for an animation, etc.)

Furthermore, that article teaches that the attributes can be associated with a formalism of the event-condition-action (ECA) type.

Unfortunately, in view of the needs generated by the development of communications via communications networks of the Internet and Intranet types, the need to use a programming specialist to draw up a multimedia document, from the above-mentioned elementary level upwards, cannot remain acceptable for long, because it generates cost that is prohibitive for communications network users who wish to make dynamic multimedia documents available to the public.

Moreover, such technology is ill-suited to such communications networks. Such networks make it possible to interconnect data-processing systems that are heterogeneous. Among such systems, it is possible to encounter systems that have particularities as regards to the presentation of multimedia documents, and, in particular, limitations on the dynamic and/or interactive aspects. For example, mention may be made of the case of a passive terminal that has no means of interaction (such as a keyboard, a mouse, etc.) and that cannot therefore implement the interactive aspects of such a multimedia document.

The solution described in the article in question does not make it easy for the representation of the document to be adapted to accommodate the particularities of the data-processing system, because once the object-oriented program has been compiled, it can no longer be modified.

In order to solve those problems, the invention firstly provides a method of dynamically representing a multimedia document in a data-processing system via a software module, said multimedia document being made up of a hierarchically-organized set of elements themselves having attributes, at least one of said attributes being associated with an event-condition-action or "ECA" type formalism (or link), said method being characterized in that it comprises the following ordered steps:

describing said multimedia document in a description language; and having said multimedia document interpreted by said software module, said ECA formalisms being interpreted dynamically so, as to enable the representation of said multimedia document to be varied by means of actions being performed as a function of events and of conditions.

The invention also provides the multimedia document itself, i.e. a multimedia document made up of a hierarchically-organized set of elements themselves having attributes, at least one of said attributes being associated with an event-condition-action or "ECA" type formalism. The multimedia document is characterized in that it is described in a description language, and in that said ECA formalisms are described in a manner such as to enable them to be interpreted by a software module so as to enable the representation of the multimedia document to be varied by means of actions being performed as a function of events and of conditions.

The invention, its characteristics, and its advantages appear more clearly from the following description given with reference to the sole figure which, by way of example, shows a small subset of elements relating to a dynamic multimedia document.

As indicated above, this figure corresponds to a representation of a portion of an interactive multimedia document considered to be in the form a set of elements installed in a data-processing system.

The data-processing system includes at least one programmed computer processing unit which may optionally be constituted by a single computer and/or which may be part of a vast ensemble in which units can communicate with one another via one or more communications networks, as is known.

The dynamic multimedia document shown includes a set of optionally-displayable elements which, by way of example, are symbolized by a graphics element 1, i.e. an element that can be displayed, entitled "play button", by a graphics element 2 entitled "pause button", and by an element 3 assumed to be non-displayable and entitled "video". The document in this example is thus a multimedia document that is interactive (and therefore dynamic).

In addition, it is possible to organize the elements in a hierarchical manner. More precisely, it is possible to define certain "composite" elements which encompass one or more "contained" elements. For example, the buttons referenced 1 and 2 may be "contained" elements which are encompassed in a "composite" element that may optionally be displayable.

In this example, attributes of the various elements are constituted by "statuses" which express their respective states and therefore the respective states of the various portions of the document, such as a status 4 expressing the selection state (selected or not selected) of the play button 1, and a status 6 characteristic of a playing state (playing or stopped) of the video element 3.

A status, e.g. the status 4, goes from a false state to a true state or vice versa as a result of the occurrence of an event which is itself the result of the behavior of an element.

This thus makes it possible to interconnect the elements via events, each of which can be considered to be a change of state relating to an element attribute.

Thus, in the example considered above, a change in the value of the status of the element 3 is, for example, conditioned by a change in the value of the status of the element 1, which change is induced by a particular event. This event which connects the element 1 to the element 3 may, for example, be the detection of a modification in status for the "selection" attribute of the element 1, when this status goes from false to true, for example. For example, the "selection" attribute may be true when the corresponding button (button 1 in this example) is selected by a user (e.g. via a graphics pointer associated with a mouse), and be false otherwise.

In a particular implementation of the invention, the modification is detected by the element 1 itself.

Thus, for example, a user acting on the "play" button for starting a video is considered to result in a change in the value of the "play" button whose "selection" attribute goes from false to true and triggers a start action thereby causing the video to start playing. Such a start action assumes that there is an attribute at the video element which is, for example, a "play" or "run" element and causes a change in status, at least for this attribute.

It is thus possible to construct a complex scenario that unfolds in steps, each of which leads from one element to another as a function of the changes in status that take place successively at the elements, and that cause said elements to act on others at which they in turn cause changes in status.

However, such changes may be dependent on conditions that are imposed and that must be satisfied. Thus, in the above-considered case, a condition that must be satisfied in order for the video to be started may be that the availability of a video program must be verified, for example.

To this end, in the invention provision is made for a dynamic multimedia document to be implemented in the form of a hierarchically-organized set of elements, in which set each element is provided with attributes. Each attribute may be associated with an event-condition-action (ECA) type formalism, as known to be implemented in industrial programmable logic controllers. Interpreting such formalisms makes it possible for the representation of the multimedia document (i.e. in general its visual or audio appearance) to be varied by means of actions triggered by events when conditions are satisfied.

As indicated above, an event is considered as corresponding to the fact that a change in the value of a status relating to an element is detected by said element as a function of a trigger. An example of an elementary trigger referenced 7 is given on the accompanying sole figure for the target constituted by the play button. As summarized in the figure, the elements taken into account to determine selection of the play button 1 are as follows:

Target: play button.selection status

Preceding value operator: equal

Preceding value: not selected

Current value operator: equal

Current value: selected.

An event may thus be considered to be determinable merely by a limited comparison between a preceding value and a current value of the same status.

An event may, in particular, be associated with a determined time lapse for a determined element, with a determined three-dimensional position of an element, or with the execution of a procedure, and it may then be expressed by a value threshold being crossed. It may also be the result of an external action for selecting an element from the set of elements of the multimedia document in question.

A condition can be represented by a logic expression that combines the current status values for determined elements of the set making up the multimedia document in question. The model takes into account the fact that an event is not always sufficient on its own to cause an action to be triggered, and that it may be necessary to subject an action to the prior condition of verifying that determined constraints are satisfied. In many cases a condition may be represented by a simple logic expression.

By way of example, a "running" condition may be reduced merely to determining whether a condition is true or false relative to the current values of a first status of the play button element 1 and of a second status of the video element 3.

In general, a condition may be described using the following simplified structure which provides:

a target constituted by the status at which the condition must be satisfied;

a comparison operator; and a threshold value determined for the status that is being taken into account.

By way of example, and as shown diagrammatically in the figure, the elementary condition 9 expressing the fact that a stop button of a video can be selected if and only if a state of preparation has been reached that is sufficient for the video to be running, may merely be written in the following form:

<video, playing status, equal, running>

An action results in a change in particular in appearance or behavior in the multimedia document that it affects, if the condition fixed when the document was written is satisfied.

Any action results in the status of some element being modified, it being possible for the status modification itself to constitute an event that is taken into account in some other element of the set of elements making up a multimedia document.

An action acts directly on a single element only of the set of elements specific to a multimedia document (although this element may optionally be a "composite" element). For example, an action may be defined using the following simplified structure which provides:

a target which indicates the element status on which the action must be directed; and a value which specifies the new value of the targeted element status.

In the example shown in the figure, the target of an action referenced 10 is thus a play status of the video element, and the action is developed for a "play" value of a determined level which must be exceeded in order for the video to start playing in the data-processing system in question.

In this example, a link 8 is provided for the subset shown in the accompanying sole figure. The link brings together the events, conditions, and actions that concern the subset, and it has a simplified structure which comprises:

one or more events, referenced 7;

one or more conditions, referenced 9; and one or more actions, referenced 10.

As already indicated above, modifying a status relating to an element of a multimedia document of the invention results in an action, when a condition authorizing the action is satisfied. The action itself results in a modification of a status at another element, and it is possible to consider the use of a set of elements making up such a multimedia document as being conditioned by a succession of changes in statuses, i.e. states, each of which concerns a respective element. Each change in status at an element can result in an action being performed on another element following a chain reaction defined by a link, i.e. an event-condition-action (ECA) proposal or formalism, or optionally a composition of ECA proposals.

Naturally, the invention applies not only to the "visible" elements of a set relating to a multimedia document structured using the invention, i.e. not only to elements that can be seen by the user, but also to "invisible" elements such as timer elements or audible elements.

A timer element may for example be used merely to trigger a stop-type action after a determined time, in particular in order to limit the time for which a determined graphics item is displayed, e.g. for displaying a button for a limited time. It may also be implemented in order to adapt the time allocated for a determined action in order to accommodate a speed change affecting the means for performing the action, in order to provide suitable matching.

As described above, and according to an essential characteristic of the invention, the multimedia document made up of elements and of links is described in a description language.

It is recalled that a description language is a computer language that, among other properties, has the property of being easy for a non-programmer to use. It makes it easy for a non-specialist to describe a multimedia document, without requiring in-depth knowledge of programming techniques.

The multimedia document as described in the description language can then be interpreted by a software module. The software module may be in the form of a browser, similar to those currently in existence for non-dynamic and non-interactive multimedia documents.

In an implementation of the invention, the description language complies with the XML (extension Markup Language) Recommendation issued by the World-Wide Web Consortium (W3C). That recommendation provides a grammar making it possible to define new description languages.

More precisely, it is advantageous to make the description language as close as possible to the HTML language which does itself also comply with the XML Recommendation of the W3C.

In this way, it is possible to minimize the learning period required by users who wish to write multimedia documents.

The HyperText Markup Language (HTML) is defined by the W3C, and numerous bibliographic references on the subject can be found on the Consortium's Internet Site whose address is http://www.w3.org.

The purpose of HTML is to describe static multimedia documents, i.e. documents that do not include aspects that are dynamic, and in particular interactive.

In an implementation of the invention, the multimedia document includes a portion describing the elements and a portion describing the formalisms, and the associations between elements and formalisms may be established by means of indicators.

Thus, it is easy for the software module interpreting the document to take into account the static portion only. This is particularly advantageous when the information-processing system in which the software module is installed is associated with a terminal that has limited capabilities. For example, this applies to a terminal which has merely a monitor and no keyboard or mouse: the interactive aspects must not then be taken into account.

A multimedia document of the invention may thus be made up of two distinct portions, the first portion being devoted to describing the elements. This portion is thus similar to a static description known in the state of the art and complying with HTML. However, it is preferable to add an identifier field to each of the elements in order to make it possible to associate the elements and the links which are described elsewhere in the document.

An example of an element could be described as follows:

```
<DIV id="controlComposite" x="110" y="300" width=
   "180" height="100" background-color="#9D9DFD">
   <BTN id="playButton" x="0" y="0"icon-enabled=
      "buttons/play.gif"icon-disabled="buttons/
      playD.gif"icon-selected="buttons/playP.gif"/>
   <BTN id="pauseButton" x="60" y="0"icon-enabled=
      "buttons/freeze.gif"icon-disabled="buttons/
      freezeD.gif"icon-selected="buttons/freezeP.gif"/>
   <BTN id="stopButton" x="60" y="0"icon-enabled=
      "buttons/stop.gif"icon-disabled="buttons/
      stopD.gif"icon-selected="buttons/stopP.gif"/>
</DIV>
```

In this example, the element is a "composite" element identified by the name "controlComposite". More precisely this composite element includes three "contained" elements identified by the names "playButton", "pauseButton", and "stopButton".

As is conventional in HTML, this "composite" element includes a plurality of attributes. These attributes relate to its location (x,y), to its dimensions (height, width), and to its appearance (background-color). In addition to these known attributes, an identification attribute (id) is provided enabling the element to be given a name.

In the same way, the three contained elements (playButton, pauseButton, and stopButton) include positioning attributes (x,y), appearance attributes (icon-enabled, icon-disabled, and icon-selected), and identification attributes (id).

The second portion of the multimedia document is devoted to the links, i.e. to the dynamic portion of the multimedia document. Each link may itself be made up of three portions: one devoted to events, one devoted to conditions, and one devoted to actions.

An example of link could be described as follows:

```
<LINK div="controlComposite">
<SELECTION_EVENT target="playButton" value=
   "true"/>
<RUN_CONDITION target="controlComposite" value=
   "true"/>
<ACTION>
   <RUN target="video"/>
   <SET_STATUS target="pauseButton" status=
      "selectability" value="true" />
   <SET_STATUS target="stopButton" status=
      "selectability" value="true" />
   <SET_STATUS target="playButton" status=
      "selectability" value="false" />
```

```
<SET_STATUS target="playButton" status="selection"
    value="true" />
</ACTION>
</LINK>
```

The link is identified by an identification attribute (div) and itself comprises three portions:

The first portion, introduced by the keyword SELECTION_EVENT corresponds to the event of the ECA proposal corresponding to the link. In this is example, this portion concerns selecting the play button.

The second portion, introduced by the keyword RUN_CONDITION corresponds to the conditions of the link. In this example, it concerns verifying that the composite element that groups together the various contained elements (i.e. the three buttons) is actually running.

Finally, the third portion, introduced by the keyword ACTION corresponds to the various actions of the link. In this example, there are two types of action: the action introduced by the keyword RUN which consists in starting to run an element (the "video" element in this example), and the actions introduced by the keyword SET_STATUS which consists in modifying the values of element statuses (in this example, the "selectability" and "selection" statuses of the three buttons).

The keyword "target" refers to the target, as defined above, while the keyword "status" naturally refers to the above-defined status.

The fact that the elements are organized hierarchically, i.e. by means of a "composite" element that can combine "contained" elements, offers a significant advantage: it is then possible to reproduce this structure on a terminal of the mobile telephone type by means of a tree structure of pages. For example, a page on the screen of the mobile telephone may correspond to a composite element.

This application, as well as other possible applications can be implemented easily and simply by the software module that must be provided for the data-processing system with which it is associated.

What is claimed is:

1. A method of dynamically representing a multimedia document in a data-processing system via a software module, said multimedia document being made up of a hierarchically-organized set of elements, themselves having attributes, at least one of said attributes being associated with an event-condition-action (ECA) type formalism, said method comprising the following ordered steps:

describing said multimedia document in a description language; and having said multimedia document interpreted by said software module; said ECA formalisms being interpreted dynamically so as to enable the representation of said multimedia document to be varied by means of actions being performed as a function of events and of conditions, in which the hierarchically-organized set is made up of composite elements, each of which is made up of contained elements, the attributes of the various elements being statuses which describe the states of the various portions of the document, and in which an event is constituted by a change in the value of a status of an element being detected by said element and resulting in an action being performed to change the appearance or the behavior of the document, when a condition constituted by a logic expression associating status values relating to various elements is satisfied.

2. A method according to claim 1, wherein said composite elements comprise a plurality of attributes.

3. A method according to claim 2, wherein said composite elements comprise an identification attribute, wherein said identification attribute enables an element to be given a name.

4. A computer readable medium comprising the executable instructions for creating a multimedia document made up of a hierarchically-organized set of elements themselves having attributes, at least one of said attributes being associated with an even-condition action (ECA) type formalism, said method comprising the following ordered steps:

describing said multimedia document in a description language; and having said multimedia document interpreted by said software module, said ECA formalisms being interpreted dynamically so as to enable the representation of said multimedia document to be varied by means of actions being performed as a function of events and of conditions in which the hierarchically-organized set is made up of composite elements, each of which is made up of contained elements, the attributes of the various elements being statuses which describe the states of the various portions of the document, and in which an event is constituted by a change in the value of a status of an element being detected by said element and resulting in an action being performed to change the appearance or the behavior of the document, when a condition constituted by a logic expression associating status values relating to various elements is satisfied.

* * * * *